(12) United States Patent
Ray et al.

(10) Patent No.: US 9,760,172 B2
(45) Date of Patent: Sep. 12, 2017

(54) DYNAMIC TACTILE INTERFACE

(71) Applicant: Tactus Technology, Inc., Fremont, CA (US)

(72) Inventors: Curtis A. Ray, Fremont, CA (US); Mario Sotelo Garcia, Fremont, CA (US); Roman Rak, Fremont, CA (US); Forrest Russell Grinstead, Fremont, CA (US); Maxwell Harshorn Shimshak, Fremont, CA (US)

(73) Assignee: Tactus Technology, Inc., Hayward, CA (US)

( * ) Notice: Subject to any disclaimer, the term of this patent is extended or adjusted under 35 U.S.C. 154(b) by 171 days.

(21) Appl. No.: 14/806,952

(22) Filed: Jul. 23, 2015

(65) Prior Publication Data

US 2016/0187980 A1   Jun. 30, 2016

Related U.S. Application Data

(60) Provisional application No. 62/028,203, filed on Jul. 23, 2014.

(51) Int. Cl.
  *G06F 3/01*   (2006.01)
  *G06F 3/041*   (2006.01)
  (Continued)

(52) U.S. Cl.
  CPC .............. *G06F 3/016* (2013.01); *F15B 15/10* (2013.01); *G06F 3/041* (2013.01); *G06F 3/04886* (2013.01); *G06F 2203/04809* (2013.01)

(58) Field of Classification Search
  CPC .. F04B 43/08–43/1136; F04B 45/06–45/0726; G06F 3/016; G06F 3/041; F15B 15/106
  See application file for complete search history.

(56) References Cited

U.S. PATENT DOCUMENTS 2,885,967 A * 5/1959 Vogel .................. F04B 43/1215
                                                           417/477.13
3,034,628 A   5/1962 Wadey
(Continued)

FOREIGN PATENT DOCUMENTS

CN     1260525 A    7/2000
CN     1530818 A    9/2004
(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.
(Continued)

*Primary Examiner* — Patrick F Marinelli
(74) *Attorney, Agent, or Firm* — Jeffrey Schox; Padowithz Alce

(57) ABSTRACT

One variation of a dynamic tactile interface includes: a dynamic tactile layer including a deformable region and a first region, the deformable region operable between a retracted setting and an expanded setting, the first region adjacent the deformable region, the deformable region tactilely distinguishable from the first region in the expanded setting; a displacement device including a fluid vessel and an actuator, the actuator displacing fluid from the fluid vessel into the dynamic tactile layer to transition the deformable region from the retracted setting into the expanded setting and displacing fluid from the dynamic tactile layer into the fluid vessel, transitioning the deformable region from the expanded setting into the retracted setting; and a fluid compensation device coupled to the displacement device and adjusting a configuration of the displacement device in (Continued)

response to a change in a volume of fluid contained within the fluid vessel.

22 Claims, 6 Drawing Sheets

(51) Int. Cl.
  *F15B 15/00* (2006.01)
  *F15B 15/10* (2006.01)
  *G06F 3/0488* (2013.01)

(56) References Cited

U.S. PATENT DOCUMENTS

| | | | |
|---|---|---|---|
| 3,441,111 A * | 4/1969 | Spalding | B60T 13/22 |
| | | | 188/156 |
| 3,453,967 A * | 7/1969 | Durfee | A61M 1/1037 |
| | | | 417/480 |
| 3,490,733 A * | 1/1970 | Berthaud | F15B 15/103 |
| | | | 251/58 |
| 3,659,354 A | 5/1972 | Sutherland | |
| 3,759,108 A | 9/1973 | Borom et al. | |
| 3,780,236 A | 12/1973 | Gross | |
| 3,818,487 A | 6/1974 | Brody et al. | |
| 4,109,118 A | 8/1978 | Kley | |
| 4,181,476 A * | 1/1980 | Malbec | F04B 43/1215 |
| | | | 417/477.12 |
| 4,209,819 A | 6/1980 | Seignemartin | |
| 4,290,343 A | 9/1981 | Gram | |
| 4,307,268 A | 12/1981 | Harper | |
| 4,467,321 A | 8/1984 | Volnak | |
| 4,477,700 A | 10/1984 | Balash et al. | |
| 4,517,421 A | 5/1985 | Margolin | |
| 4,543,000 A | 9/1985 | Hasenbalg | |
| 4,584,625 A | 4/1986 | Kellogg | |
| 4,700,025 A | 10/1987 | Hatayama et al. | |
| 4,743,895 A | 5/1988 | Alexander | |
| 4,772,205 A | 9/1988 | Chlumsky et al. | |
| 4,920,343 A | 4/1990 | Schwartz | |
| 4,940,734 A | 7/1990 | Ley et al. | |
| 4,980,646 A | 12/1990 | Zemel | |
| 5,090,297 A | 2/1992 | Paynter | |
| 5,194,852 A | 3/1993 | More et al. | |
| 5,195,659 A | 3/1993 | Eiskant | |
| 5,212,473 A | 5/1993 | Louis | |
| 5,222,895 A | 6/1993 | Fricke | |
| 5,286,199 A | 2/1994 | Kipke | |
| 5,346,476 A | 9/1994 | Elson | |
| 5,369,228 A | 11/1994 | Faust | |
| 5,412,189 A | 5/1995 | Cragun | |
| 5,459,461 A | 10/1995 | Crowley et al. | |
| 5,470,212 A * | 11/1995 | Pearce | F04B 43/1215 |
| | | | 119/311 |
| 5,488,204 A | 1/1996 | Mead et al. | |
| 5,496,174 A | 3/1996 | Garner | |
| 5,666,112 A | 9/1997 | Crowley et al. | |
| 5,717,423 A | 2/1998 | Parker | |
| 5,729,222 A | 3/1998 | Iggulden et al. | |
| 5,742,241 A | 4/1998 | Crowley et al. | |
| 5,754,023 A | 5/1998 | Roston et al. | |
| 5,766,013 A | 6/1998 | Vuyk | |
| 5,767,839 A | 6/1998 | Rosenberg | |
| 5,835,080 A | 11/1998 | Beeteson et al. | |
| 5,880,411 A | 3/1999 | Gillespie et al. | |
| 5,889,236 A | 3/1999 | Gillespie et al. | |
| 5,917,906 A | 6/1999 | Thornton | |
| 5,943,043 A | 8/1999 | Furuhata et al. | |
| 5,977,867 A | 11/1999 | Blouin | |
| 5,982,304 A | 11/1999 | Selker et al. | |
| 6,067,116 A | 5/2000 | Yamano et al. | |
| 6,154,198 A | 11/2000 | Rosenberg | |
| 6,154,201 A | 11/2000 | Levin et al. | |
| 6,160,540 A | 12/2000 | Fishkin et al. | |
| 6,169,540 B1 | 1/2001 | Rosenberg et al. | |
| 6,187,398 B1 | 2/2001 | Eldridge | |
| 6,188,391 B1 | 2/2001 | Seely et al. | |
| 6,218,966 B1 | 4/2001 | Goodwin et al. | |
| 6,243,074 B1 | 6/2001 | Fishkin et al. | |
| 6,243,078 B1 | 6/2001 | Rosenberg | |
| 6,268,857 B1 | 7/2001 | Fishkin et al. | |
| 6,271,828 B1 | 8/2001 | Rosenberg et al. | |
| 6,278,441 B1 | 8/2001 | Gouzman et al. | |
| 6,300,937 B1 | 10/2001 | Rosenberg | |
| 6,310,614 B1 | 10/2001 | Maeda et al. | |
| 6,323,846 B1 | 11/2001 | Westerman et al. | |
| 6,337,678 B1 | 1/2002 | Fish | |
| 6,354,839 B1 | 3/2002 | Schmidt et al. | |
| 6,356,259 B1 | 3/2002 | Maeda et al. | |
| 6,359,572 B1 | 3/2002 | Vale | |
| 6,366,272 B1 | 4/2002 | Rosenberg et al. | |
| 6,369,803 B2 | 4/2002 | Brisebois et al. | |
| 6,384,743 B1 | 5/2002 | Vanderheiden | |
| 6,414,671 B1 | 7/2002 | Gillespie et al. | |
| 6,429,846 B2 | 8/2002 | Rosenberg et al. | |
| 6,437,771 B1 | 8/2002 | Rosenberg et al. | |
| 6,462,294 B2 | 10/2002 | Davidson et al. | |
| 6,469,692 B2 | 10/2002 | Rosenberg | |
| 6,486,872 B2 | 11/2002 | Rosenberg et al. | |
| 6,498,353 B2 | 12/2002 | Nagle et al. | |
| 6,501,462 B1 | 12/2002 | Garner | |
| 6,509,892 B1 | 1/2003 | Cooper et al. | |
| 6,529,183 B1 | 3/2003 | MacLean et al. | |
| 6,573,844 B1 | 6/2003 | Venolia et al. | |
| 6,636,202 B2 | 10/2003 | Ishmael et al. | |
| 6,639,581 B1 | 10/2003 | Moore et al. | |
| 6,655,788 B1 | 12/2003 | Freeman | |
| 6,657,614 B1 | 12/2003 | Ito et al. | |
| 6,667,738 B2 | 12/2003 | Murphy | |
| 6,681,031 B2 | 1/2004 | Cohen et al. | |
| 6,683,627 B1 | 1/2004 | Ullmann et al. | |
| 6,686,911 B1 | 2/2004 | Levin et al. | |
| 6,697,086 B2 | 2/2004 | Rosenberg et al. | |
| 6,700,556 B2 | 3/2004 | Richley et al. | |
| 6,703,924 B2 | 3/2004 | Tecu et al. | |
| 6,743,021 B2 | 6/2004 | Prince et al. | |
| 6,788,295 B1 | 9/2004 | Inkster | |
| 6,819,316 B2 | 11/2004 | Schulz et al. | |
| 6,850,222 B1 | 2/2005 | Rosenberg | |
| 6,861,961 B2 | 3/2005 | Sandbach et al. | |
| 6,877,986 B2 | 4/2005 | Fournier et al. | |
| 6,881,063 B2 | 4/2005 | Yang | |
| 6,930,234 B2 | 8/2005 | Davis | |
| 6,937,225 B1 | 8/2005 | Kehlstadt et al. | |
| 6,975,305 B2 | 12/2005 | Yamashita | |
| 6,979,164 B2 | 12/2005 | Kramer | |
| 6,982,696 B1 | 1/2006 | Shahoian | |
| 6,995,745 B2 | 2/2006 | Boon et al. | |
| 7,004,655 B2 | 2/2006 | Ferrara | |
| 7,015,894 B2 | 3/2006 | Morohoshi | |
| 7,027,032 B2 | 4/2006 | Rosenberg et al. | |
| 7,056,051 B2 | 6/2006 | Fiffie | |
| 7,061,467 B2 | 6/2006 | Rosenberg | |
| 7,064,655 B2 | 6/2006 | Murray et al. | |
| 7,079,111 B2 | 7/2006 | Ho | |
| 7,081,888 B2 | 7/2006 | Cok et al. | |
| 7,096,852 B2 | 8/2006 | Gregorio | |
| 7,102,541 B2 | 9/2006 | Rosenberg | |
| 7,104,152 B2 | 9/2006 | Levin et al. | |
| 7,106,305 B2 | 9/2006 | Rosenberg | |
| 7,106,313 B2 | 9/2006 | Schena et al. | |
| 7,109,967 B2 | 9/2006 | Hioki et al. | |
| 7,112,737 B2 | 9/2006 | Ramstein | |
| 7,113,166 B1 | 9/2006 | Rosenberg et al. | |
| 7,116,317 B2 | 10/2006 | Gregorio et al. | |
| 7,124,425 B1 | 10/2006 | Anderson, Jr. et al. | |
| 7,129,854 B2 | 10/2006 | Arneson et al. | |
| 7,131,073 B2 | 10/2006 | Rosenberg et al. | |
| 7,136,045 B2 | 11/2006 | Rosenberg et al. | |
| 7,138,977 B2 | 11/2006 | Kinerk et al. | |
| 7,138,985 B2 | 11/2006 | Nakajima | |
| 7,143,785 B2 | 12/2006 | Maerkl et al. | |
| 7,144,616 B1 | 12/2006 | Unger et al. | |
| 7,148,875 B2 | 12/2006 | Rosenberg et al. | |

(56) References Cited

U.S. PATENT DOCUMENTS

| | | |
|---|---|---|
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,116,831 B2 | 2/2012 | Meitzler et al. |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |

(56) References Cited

U.S. PATENT DOCUMENTS

| | | |
|---|---|---|
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,294,557 B1 | 10/2012 | Saddik et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,390,771 B2 | 3/2013 | Sakai et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,570,295 B2 | 10/2013 | Ciesla et al. |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 8,922,503 B2 | 12/2014 | Ciesla et al. |
| 8,922,510 B2 | 12/2014 | Ciesla et al. |
| 8,928,621 B2 | 1/2015 | Ciesla et al. |
| 8,970,403 B2 | 3/2015 | Ciesla et al. |
| 9,035,898 B2 | 5/2015 | Ciesla |
| 9,075,429 B1 | 7/2015 | Karakotsios |
| 9,116,617 B2 | 8/2015 | Ciesla et al. |
| 9,128,525 B2 | 9/2015 | Yairi et al. |
| 9,274,612 B2 | 3/2016 | Ciesla et al. |
| 9,274,635 B2 | 3/2016 | Birnbaum |
| 9,372,539 B2 | 6/2016 | Ciesla et al. |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0125084 A1 | 9/2002 | Kreuzer et al. |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0184517 A1 | 10/2003 | Senzui et al. |
| 2003/0206153 A1 | 11/2003 | Murphy |
| 2003/0223799 A1 | 12/2003 | Pihlaja |
| 2003/0234769 A1 | 12/2003 | Cross et al. |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0164148 A1 | 7/2005 | Sinclair |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0053387 A1 | 3/2006 | Ording |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152982 A1 | 7/2007 | Kim et al. |
| 2007/0152983 A1 | 7/2007 | McKillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0254411 A1 | 11/2007 | Uhland et al. |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0131624 A1 | 6/2008 | Egami et al. |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174321 A1 | 7/2008 | Kang et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0249643 A1 | 10/2008 | Nelson |
| 2008/0251368 A1 | 10/2008 | Holmberg et al. |
| 2008/0252607 A1 | 10/2008 | De et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |

(56) References Cited

U.S. PATENT DOCUMENTS

| | | |
|---|---|---|
| 2008/0312577 A1 | 12/2008 | Drasler et al. |
| 2008/0314725 A1 | 12/2008 | Karhiniemi et al. |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0191402 A1 | 7/2009 | Beiermann et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0254053 A1* | 10/2009 | Svensby ............ A61F 13/0203 604/290 |
| 2009/0256817 A1 | 10/2009 | Perlin et al. |
| 2009/0273578 A1 | 11/2009 | Kanda et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0090814 A1 | 4/2010 | Cybart et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0171729 A1 | 7/2010 | Chun |
| 2010/0177050 A1 | 7/2010 | Heubel et al. |
| 2010/0182135 A1 | 7/2010 | Moosavi |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0238367 A1 | 9/2010 | Montgomery et al. |
| 2010/0253633 A1 | 10/2010 | Nakayama et al. |
| 2010/0283731 A1 | 11/2010 | Grant et al. |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0028305 A1 | 2/2011 | Lim et al. |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0102462 A1 | 5/2011 | Birnbaum |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0227872 A1 | 9/2011 | Huska et al. |
| 2011/0234502 A1 | 9/2011 | Yun et al. |
| 2011/0241442 A1 | 10/2011 | Mittleman et al. |
| 2011/0242749 A1 | 10/2011 | Huang et al. |
| 2011/0248947 A1 | 10/2011 | Krahenbuhl et al. |
| 2011/0248987 A1 | 10/2011 | Mitchell |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2011/0306931 A1 | 12/2011 | Kamen et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0044277 A1 | 2/2012 | Adachi |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0162774 A1 | 6/2012 | Ishida et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0241718 A1 | 9/2013 | Wang et al. |
| 2013/0275888 A1 | 10/2013 | Williamson et al. |
| 2014/0034469 A1 | 2/2014 | Krumpelman |
| 2014/0043291 A1 | 2/2014 | Ciesla et al. |
| 2014/0132532 A1 | 5/2014 | Yairi et al. |
| 2014/0160044 A1* | 6/2014 | Yairi ..................... G06F 3/016 345/173 |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0015573 A1 | 1/2015 | Burtzlaff et al. |
| 2015/0029658 A1 | 1/2015 | Yairi et al. |
| 2015/0064405 A1 | 3/2015 | Koch et al. |
| 2015/0070836 A1 | 3/2015 | Yairi et al. |
| 2015/0091834 A1 | 4/2015 | Johnson |
| 2015/0091870 A1 | 4/2015 | Ciesla et al. |
| 2015/0138110 A1 | 5/2015 | Yairi et al. |
| 2015/0145657 A1 | 5/2015 | Levesque et al. |
| 2015/0177839 A1 | 6/2015 | Ciesla et al. |

(56) References Cited

U.S. PATENT DOCUMENTS

| | | | |
|---|---|---|---|
| 2015/0205419 A1 | 7/2015 | Calub et al. | |
| 2015/0293591 A1 | 10/2015 | Yairi et al. | |
| 2015/0293633 A1 | 10/2015 | Ray et al. | |
| 2015/0331525 A1* | 11/2015 | Yairi | F04B 43/113 345/173 |
| 2016/0187981 A1* | 6/2016 | Ray | G06F 3/041 345/156 |

FOREIGN PATENT DOCUMENTS

| | | |
|---|---|---|
| CN | 1882460 A | 12/2006 |
| CN | 201130336 | 10/2008 |
| EP | 2000884 A1 | 12/2008 |
| EP | 2348801 A2 | 7/2011 |
| EP | 2936476 A1 | 10/2015 |
| GB | 190403152 A | 12/1904 |
| GB | 108771 A | 8/1917 |
| GB | 1242418 A | 8/1971 |
| JP | s63164122 A | 7/1988 |
| JP | 06125188 A | 6/1994 |
| JP | 10255106 | 9/1998 |
| JP | H10255106 | 9/1998 |
| JP | 2004111829 A | 4/2004 |
| JP | 2004178117 A | 6/2004 |
| JP | 2004303268 A | 10/2004 |
| JP | 2006053914 A | 1/2005 |
| JP | 2006268068 A | 10/2006 |
| JP | 2006285785 A | 10/2006 |
| JP | 200964357 A | 3/2009 |
| JP | 2009064357 A | 3/2009 |
| JP | 2010039602 A | 2/2010 |
| JP | 2010072743 A | 4/2010 |
| JP | 2011508935 A | 3/2011 |
| JP | 2014526106 A | 10/2014 |
| KR | 20000010511 | 2/2000 |
| KR | 100677624 B | 1/2007 |
| KR | 20070047767 A | 5/2007 |
| KR | 20090023364 | 11/2012 |
| WO | 2004028955 A2 | 4/2004 |
| WO | 2006082020 A1 | 8/2006 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A1 | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011108382 A1 | 9/2011 |
| WO | 2011112984 A | 9/2011 |
| WO | 2011118382 A1 | 9/2011 |
| WO | 2011133604 A | 10/2011 |
| WO | 2011133605 A | 10/2011 |
| WO | 2012054781 A1 | 4/2012 |
| WO | 2013022805 A1 | 2/2013 |
| WO | 2013173624 A2 | 11/2013 |
| WO | 2014047656 A2 | 3/2014 |
| WO | 2014095935 A1 | 6/2014 |

OTHER PUBLICATIONS

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.

Jeong et al., "Tunable Microdoublet Lens Array," Optical Society of America, Optics Express; vol. 12, No. 11. May 31, 2004, 7 pages.

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 (Jun. 20, 2012) pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

Preumont, A. Vibration Control of Active Structures: An Introduction, Jul. 2011.

* cited by examiner

DYNAMIC TACTILE INTERFACE

CROSS-REFERENCE TO RELATED APPLICATIONS

The application claims the benefit of U.S. Provisional Patent Application No. 62/028,203, filed on 23 Jul. 2014, which is incorporated in its entirety by this reference.

This application is related to U.S. patent application Ser. No. 11/969,848, filed on 4 Jan. 2008, U.S. patent application Ser. No. 13/414,589, filed 7 Mar. 2012, U.S. patent application Ser. No. 13/456,010, filed 25 Apr. 2012, U.S. patent application Ser. No. 13/456,031, filed 25 Apr. 2012, U.S. patent application Ser. No. 13/465,737, filed 7 May 2012, U.S. patent application Ser. No. 13/465,772, filed 7 May 2012, and U.S. Patent Application No. 61/727,083, filed on 15 Nov. 2012, all of which are incorporated in their entireties by this reference.

TECHNICAL FIELD

This invention relates generally to touch-sensitive displays, and more specifically to a new and useful dynamic tactile interface in the field of touch-sensitive displays.

DESCRIPTION OF THE EMBODIMENTS

The following description of the invention is not intended to limit the invention to these embodiments, but rather to enable any person skilled in the art to make and use this invention.

1. Dynamic Tactile Interface

Figure 1:
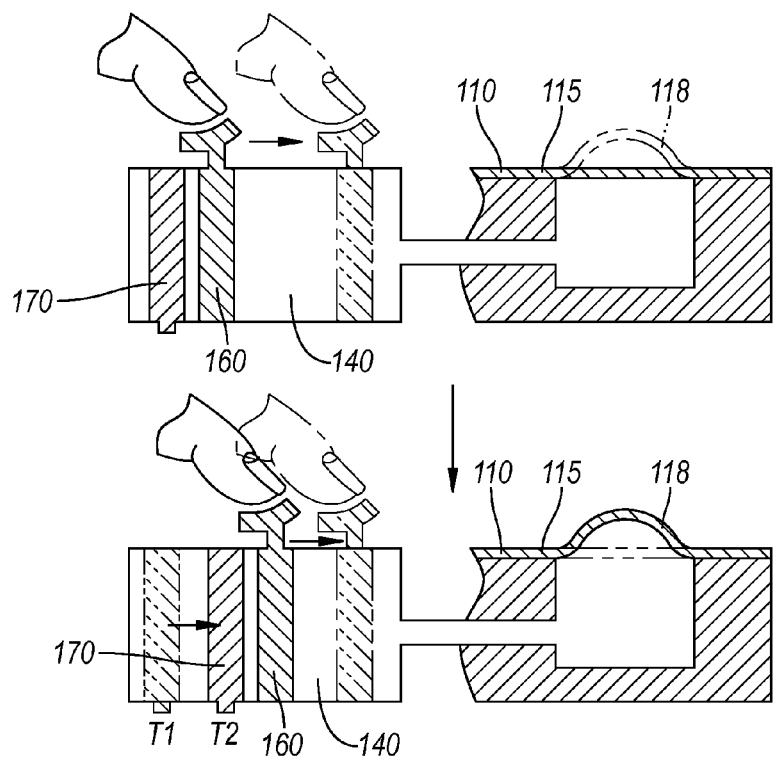
FIG. 1 is a flowchart representation of a dynamic tactile interface of one embodiment of the invention.

As shown in FIG. 1, a dynamic tactile interface includes: a dynamic tactile layer 110 including a deformable region 118 and a first region 115, the deformable region 118 operable between a retracted setting and an expanded setting, the first region 115 adjacent the deformable region 118, the deformable region 118 tactilely distinguishable from the first region 115 in the expanded setting; a displacement device 160 including a fluid vessel 140 and an actuator, the actuator displacing fluid from the fluid vessel 140 into the dynamic tactile layer 110 to transition the deformable region 118 from the retracted setting into the expanded setting and displacing fluid from the dynamic tactile layer no into the fluid vessel 140, transitioning the deformable region 118 from the expanded setting into the retracted setting; and a fluid compensation device 170 coupled to the displacement device 160 and adjusting a configuration of the displacement device 160 in response to a change in a volume of fluid contained within the fluid vessel 140.

2. Applications

The dynamic tactile interface includes a fluid compensation device 170 that adjusts the configuration of the displacement device 160 in response to a change in the volume of fluid within a fluid circuit defined by the fluid vessel 140, the fluid channels, and the dynamic tactile layer 110. Generally, the dynamic tactile interface functions to compensate for fluid losses from the fluid circuit by adjusting a volume of the fluid circuit. The fluid compensation device adjusts the volume of the fluid circuit so that the displacement device can consistently transition the deformable region 118 between a retracted setting at a consistent height in an expanded setting at a second consistent height and maintains a consistent fluid pressure within the fluid circuit in order to prevent evaporation of the fluid, which causes the formation of bubbles.

The dynamic tactile interface functions as a tactilely dynamic interface surface for a device to provide intermittent tactile guidance to an input region on the device. For example, the dynamic tactile interface can be integrated or applied over a touchscreen of a mobile computing device to provide tactile guidance to a user interacting with the touchscreen to control the device. In one implementation, the deformable region 118 is planar or flush with the first region in the retracted setting and is raised above the first region to define a tactilely distinguishable feature on the tactile surface in the expanded setting. In this implementation, the deformable region 118 can coincide with (i.e. be arranged over) an input key rendered on a display of the device such that the deformable region 118 mimics a raised key in the expanded setting, thus tactilely guiding entry of the corresponding input key into a touch sensor of the device by a user. The deformable region 118 can then be retracted to yield a flush, smooth, and/or continuous surface and substantially minimal optical distortion across the first region 115 and the deformable region 118. For example, the displacement device 160 can transition the deformable region 118 into the expanded setting when the user is providing an input or has been prompted to provide an input to the touchscreen, such as with a finger, stylus, or any other suitable input object. Thus, the displacement device 160 can transition the deformable region 118 back to the retracted setting when the user is no longer providing an input to the touchscreen such that the tactile surface is substantially flush with the first region, thereby yielding reduced optical distortion of an image output by the display and transmitted through the tactile layer 110.

In particular, the dynamic tactile interface can incorporate a dynamic tactile layer 110 as described in U.S. patent application Ser. Nos. 11/969,848, 13/414,589, 13/456,010, 13/456,031, 13/465,737, and 13/465,772 and additional components to compensate for fluid loss from the fluid vessel 140 and the dynamic tactile layer 110 over time. For example, fluid displaced by the displacement device 160 to expand and retract one or more deformable regions within the dynamic tactile layer 110 can be absorbed into a substrate or a tactile layer 110 of the dynamic tactile layer 110 over time, thereby reducing a total volume of fluid available to the system over time (e.g., over several days, weeks, or months). The fluid channels, the fluid conduits, the fluid vessel 140, and the displacement device 160 of the dynamic tactile interface can cooperate to define a fluid circuit, and the total volume of available fluid within the fluid circuit of the dynamic tactile interface can thus decrease over time, thereby changing a maximum height, stiffness, or size of a deformable region 118 in the expanded setting, thereby yielding optical aberrations in the dynamic tactile layer 110, or producing other non-desirable tactile or visual changes within the dynamic tactile interface as fluid is pumped into the dynamic tactile layer 110 to expand one or more deformable regions. Such changes may adversely affect optical clarity or tactile feel of the dynamic tactile layer 110 and may therefore adversely affect the viewing experience of a user viewing an image rendered on a display behind the dynamic tactile layer 110 or the tactile experience of a user while interacting with a "button" (i.e. a deformable region 118 in the expanded setting) of the dynamic tactile interface. Thus, the compensation device 170 and the fluid vessel 140 can cooperate with the displacement device 160 to alter the effective volume and of, therefore, the effective pressure within the fluid circuit over time to compensate for fluid loss due to evaporation to ambient, absorption into the dynamic tactile layer 110 (and/or other components of the dynamic tactile interface), slow leakage from the fluid circuit, etc.

In order to retract the deformable region 118 from the expanded setting to the retracted setting, the displacement device 160 can draw fluid from the dynamic tactile interface layer into a fluid vessel 140. At an initial time, the fluid circuit, which includes the fluid channels, fluid conduits, fluid vessel 140, and dynamic tactile interface layer, contains an initial volume of fluid at an initial pressure. Over time, fluid loss yields a smaller volume of fluid within the fluid circuit. When the displacement device 160 draws fluid back into the fluid vessel 140 to retract the deformable region 118, at the initial time, the displacement device 160 can return a constant volume of fluid from the fluid channel back to the fluid vessel 140. However, when fluid is lost from the fluid circuit due to absorption, evaporation, and/or leakage and the volume of the fluid within the fluid circuit thus decreases, the act of drawing a constant volume of fluid back into the fluid vessel 140 may yield a new pressure within the fluid vessel 140 lower than the initial pressure within the fluid vessel 140. The new lower pressure in combination with the same ambient temperature may thus cause dissolved gas in the fluid to come out of solution Boiling of fluid within the fluid circuit can cause the formation of bubbles in the fluid, which can cause optical aberrations, yield inefficient expansion and retraction of the deformable region 118, affect the lifespan of the constituent hardware of the dynamic tactile interface device, etc.

3. Displacement Device

The dynamic tactile interface incorporates a displacement device actuated as described in U.S. Patent Application No. 61/727,083, which is incorporated in its entirety by this reference. The displacement device 160 includes a fluid vessel 140 that contains fluid and an actuator that displaces fluid to and from the fluid vessel 140. In particular the displacement device 160 of the dynamic tactile interface displaces fluid from the fluid vessel 140 into the dynamic tactile layer 110 to transition a deformable region 118 from the retracted setting into the expanded setting and displaces fluid out of the dynamic tactile layer no to transition the deformable region 118 from the expanded setting into the retracted setting. Generally, the displacement device 160 functions to control a vertical position of one or more deformable regions of the dynamic tactile layer no by pumping fluid into and out of the dynamic tactile layer no, thereby modulating fluid pressure within the dynamic tactile layer no to expand and retract one or more deformable regions, such as described in U.S. patent application Ser. Nos. 11/969,848, 13/414,589, 13/456,010, 13/456,737, 13/465,772, which are herein incorporated in their entireties by this reference.

In one implementation, the displacement device 160 is coupled to an elongated tubular fluid vessel 140 with a flexible and substantially impermeable membrane and an actuator that twists the tubular fluid vessel 140 to displace fluid out of the fluid vessel 140 and into the dynamic tactile layer 110, such as described in U.S. patent application Ser. No. 14/081,519, which is incorporated herein in its entirety by this reference. Subsequently, to return fluid from the dynamic tactile layer 110 back into the fluid vessel 140, the actuator can return to an initial state, and, through its resilience, the fluid vessel 140 can transition back to its initial form, thereby drawing a vacuum within the fluid circuit to draw fluid out of the dynamic tactile layer 110 back into the fluid vessel 140.

In another implementation, the displacement device 160 is coupled to an elongated fluid vessel 140 including a flexible and substantially impermeable membrane and an actuator that runs along the axis of the elongated fluid vessel 140 to displace fluid out of the fluid vessel 140, such as described in U.S. Patent Application No. 61/907,534, which is incorporated in its entirety by this reference. The actuator displaces fluid by applying pressure on the membrane of the elongated fluid vessel 140. The pressure displaces fluid from the elongated fluid vessel 140 by modifying the external pressure surrounding the fluid vessel 140. Alternatively, the displacement device actuator can apply pressure directly to the fluid in the fluid vessel 140 displacing the fluid itself rather than a membrane directly surrounding the fluid. For example, the displacement device 160 can include an actuator coupled to a pair of platens, and the fluid vessel 140 can be sandwiched between the pair of platens such that actuation of the actuator compresses the fluid vessel 140 to displace fluid into the fluid channel. Alternatively, the displacement device 160 can include an actuator coupled to a single platen such that the fluid vessel 140 can be sandwiched between the platen and an interior surface of a chamber that houses the displacement device 160. A user interfacing with the displacement device 160 can press, move, and/or rotate the platen to press the fluid vessel 140 against the interior surface, and the increased external pressure of the platen on the fluid vessel 140 can cause displacement of the fluid from the fluid vessel 140 into the dynamic tactile interface layer.

In an example implementation of the displacement device 160, the actuator includes a piston coupled to a lever or other actuation mechanism suitable to drive the piston to compress the elongated fluid vessel 140 in a direction toward an opening in the fluid vessel 140, thereby emitting fluid from the fluid vessel 140, and the actuator can drive the piston away from the opening to receive fluid back into the fluid vessel 140. For example, the opening in the fluid vessel 140 can be coupled to a fluid channel that leads to the dynamic tactile interface layer.

However, the displacement device 160 (e.g., the fluid vessel 140 and the actuator) can be of any other form and can be actuated in any other suitable way to pump fluid between the dynamic tactile layer no and the fluid vessel 140.

4. Fluid Compensation Device

The fluid compensation device 170 of the dynamic tactile interface is coupled to the displacement device 160 and adjusts a configuration of the displacement device 160 in response to a change in a volume of fluid contained within the fluid vessel 140.

4.1 Modifying Effective Volume of Fluid Vessel

In one implementation, the fluid compensation device 170 enables a user to compensate for fluid lost from the fluid circuit by manually modifying the volume of the fluid vessel 140. In particular, in the event that fluid is lost from the fluid circuit due to evaporation, absorption, and/or leakage, etc., the reduced volume of fluid may cause a drop in fluid pressure within the fluid circuit, and the fluid compensation device 170 can therefore reduce the volume of the fluid circuit by compressing the fluid vessel 140, thereby reducing the volume of the fluid vessel 140, to return the fluid circuit to an initial (or previous) fluid pressure. For example, the fluid compensation device 170 can reduce the volume of the fluid circuit (e.g., the fluid vessel 140, the fluid channels, and the dynamic tactile layer no) by a magnitude proportional to the volume of fluid loss, thereby causing the fluid pressure within the fluid circuit to rise, such as to match ambient pressure for the deformable region in the retracted setting.

Figure 2:
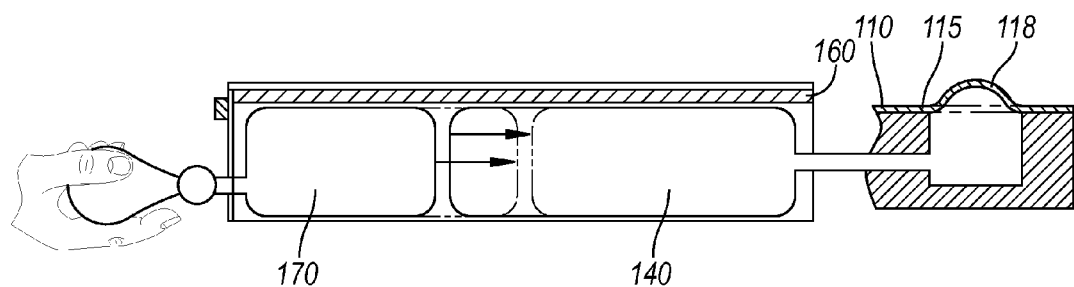
FIG. 2 is a flowchart representation of one variation of the dynamic tactile interface.

In one example, the fluid compensation device can compensate for fluid loss from the fluid circuit by compressing the fluid vessel 140, causing the volume of the fluid vessel 140 to decrease by a volume proportional to the volume of fluid loss. As shown in FIG. 2, the fluid compensation device can include a flexible bladder filled with a volume of fluid, such as air, silicone oil, water, or any other suitable fluid. The flexible bladder can be located adjacent the fluid vessel 140 such that the flexible bladder contacts the fluid vessel 140. The compensation device further includes a bladder-modifying actuator—or compensation device actuator—that increases the volume of the bladder in order to reduce the volume of the fluid vessel by compression of the fluid vessel, and decreases the volume of the bladder in order to increase the volume of the fluid vessel. In one example, the fluid vessel 140 and the bladder occupy a chamber with rigid walls. In this example, when the fluid vessel 140 and the rest of the fluid circuit are filled with fluid and before substantial fluid loss occurs, the fluid vessel 140 occupies an initial fluid vessel volume and the bladder occupies an initial bladder volume. At the initial state, the initial fluid vessel volume and the bladder volume conform to occupy the entirety of the chamber volume. Over time, as the fluid circuit loses fluid due to evaporation, absorption, and/or leakage, the volume of the fluid vessel 140 decreases, a user can manually actuate the compensation device actuator to pump bladder fluid into the bladder to increase the volume of the bladder, thereby decreasing the volume of the fluid vessel within the chamber. In this example, the compensation device actuator can be a mechanical or electromechanical pump that supplies air or any other bladder fluid to the bladder in order to increase the volume of the bladder. By increasing the bladder volume, the bladder applies a pressure on the fluid vessel 140, thereby decreasing the effective volume of the fluid vessel to compensate for the volume of fluid lost from the fluid circuit. The decrease in the volume of fluid within the fluid circuit without fluid compensation can yield lower pressures (e.g., relative partial vacuum) within the fluid circuit and, over a period of time, cause bubbles to form in the fluid. Therefore, the pressure applied by the bladder on the fluid vessel can cause the reduction of the effective volume of the fluid vessel such that the new effective volume of the fluid vessel contains fluid of a pressure corresponding to approximately the fluid pressure of the fluid vessel prior to the fluid loss. Thus, the compensation device can maintain a minimum pressure within the fluid circuit above a threshold pressure during equilibrium states (e.g., static retracted setting periods) and a vaporization pressure, which corresponds to the pressure at which the fluid in the fluid circuit boils at ambient temperatures. By maintaining the fluid pressure to prevent boiling of the fluid, the compensation device substantially prevents evaporation of—and formation of bubbles within—the fluid contained within the fluid circuit.

In a similar example, the compensation device includes a bladder that surrounds the fluid vessel 140. By increasing the volume of the bladder, the inner diameter of the bladder contracts around the outer diameter of the fluid vessel 140, thereby reducing the volume of the fluid vessel 140 and raising the pressure within the fluid vessel 140 (and, therefore, within the fluid circuit). Thus, the compensation device can maintain the pressure within the fluid circuit, preventing boiling of the fluid due to lower pressure within the fluid circuit due to a decreased fluid volume therein.

Figure 4:
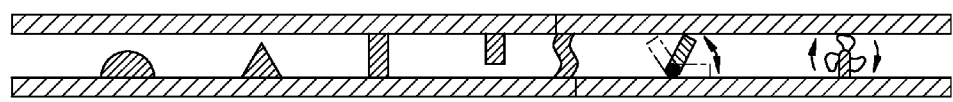
FIG. 4 is a schematic representation of one implementation of the dynamic tactile interface.

In another implementation, the fluid compensation device 170 compensates for fluid loss from the fluid circuit by reducing the volume of the fluid vessel 140 and/or the volume of the fluid circuit by implementing stop gates that prevent fluid from flowing into a portion of the fluid vessel 140, and/or blocking off a portion of the fluid vessel 140 to fluid flow. As shown in FIG. 1, in this implementation, the compensation device 170 can include one or more fluid-tight gates located in the fluid vessel 140 and substantially restricting the flow of fluid beyond a certain location. The gate(s) can be positioned within the fluid circuit to effect (e.g., reduce) the effective volume of the fluid circuit (e.g., the fluid vessel 140. Thus, the gates can cooperate with the membrane of the fluid vessel to define an active volume of the fluid vessel into and out of which fluid can flow to retract and expand the deformable region, respectively. The gates can be of any shape suitable for resisting the flow of fluid and sealing against an interior wall of the fluid vessel membrane, as shown in FIG. 4.

In one example of the foregoing implementation, the compensation device 170 includes a fluid-tight gate and a pump, which can displace fluid from one side of the fluid-tight gate to the opposite side, that are coupled to the fluid vessel 140 with a substantially rigid membrane. The fluid-tight gates can hinge from an interior surface of the fluid vessel 140 and lock into place, thereby preventing the flow of fluid passed the gate. The fluid-tight hinge gates can lie substantially flush with the interior surface of the fluid vessel 140 when not used to define the active volume of the fluid vessel. The fluid tight gates can be situated at intervals along the length of the fluid vessel 140 so that the gates can be deployed to set a desired volume of the fluid vessel 140, such as to compensate for previous fluid loss from the fluid circuit. For example, the gate that can reduce the volume of the fluid vessel 140 (e.g., the gate nearest the end of an elongate fluid vessel 140 that is opposite the end of the fluid vessel 140 coupled to the fluid channel) can deploy first. As the fluid circuit loses more fluid, gates that reduce the volume of the fluid vessel can be deployed.

Alternatively, the fluid-tight gate can include a barrier of substantially the same size and shape as the inner size and shape of the fluid vessel 140. A seal (e.g., an o-ring) can be arranged about a perimeter of the fluid-tight gate to seal the fluid tight gate against the interior surface of the fluid vessel.

For example, a first gate that can be set to a new position closer to a second (fixed or movable) gate within the fluid vessel 140 to reduce the total effective volume of the fluid vessel 140. As additional fluid is lost from the fluid circuit over time, the first gate can be manually shifted closer to the second gate, thereby further reducing the effective volume of the fluid vessel to compensate for fluid loss over time. The fluid-tight gate can lock into place with a shaft, pin, ratchet, detent, or other suitable locking mechanism. Alternatively, the seal can apply sufficient friction on the interior wall of the fluid vessel 140 to prevent the gate from moving from a set location. For example, the seal can be hydraulically or pneumatically deflated to allow the gate to slide to a desired location when the seal is substantially deflated and inflated to lock the gate in place due to frictional contact between the seal and the interior wall of the fluid vessel 140. The pump can be a manually-operated hand pump and can pump air or any other suitable fluid into an active portion of the fluid vessel 140, from which fluid flows into the fluid circuit, from an inactive portion of the fluid vessel 140 on a side of the fluid-tight gate opposite the active portion of the fluid vessel 140. Alternatively, the pump can include any other pump suitable for displacing fluid into the fluid vessel 140, such as an automatic and/or electro-mechanically actuated pump. In order to compensate for fluid loss, the compensation device can pump air or any other suitable fluid into the fluid vessel 140 through the pump, thereby displacing the fluid of the fluid circuit into the desired, and now reduced, portion of the fluid vessel 140. Alternatively, compensation device can displace fluid from a portion of the fluid vessel 140 into which the gate prevents fluid flowing into a portion of the fluid vessel 140 from which the fluid flows to and from the rest of the fluid circuit.

In another implementation, the compensation device can include a contraction device, such as a band, belt, strap, clamp, etc., that contracts the fluid vessel 140 and/or displaces fluid out of a portion of the fluid vessel 140, thereby reducing the volume of the fluid vessel 140 and, therefore, the volume of the fluid circuit. The contraction device can wrap around all or a portion of the fluid vessel 140. In this implementation, the fluid vessel 140 can include a malleable membrane that can contract to reduce the volume of the fluid vessel 140 to compensate for the reduced volume of the fluid within the fluid vessel 140. The compensation device can include a set of contraction devices of various fixed sizes, inner diameters, and/or any other contraction dimensions that define various sizes to which the fluid vessel 140 can be contracted. In order to vary the magnitude of fluid compensation, the compensation device can include a device that selects from the set of contraction devices the size a particular contraction device required to compensate for a current state of fluid loss and that places the particular contraction device in a position to contract the fluid vessel to the desired volume. Alternatively, each contractive device in the set of contraction devices can be selected manually by a user and applied to the fluid vessel 140 to achieve the desired fluid vessel volume 140. Yet, alternatively, the contraction device can be actuated by a compensation device actuator, which alters the contraction size of the compensation device 170. Thus, as the fluid loss from the fluid circuit increases, the contraction size can vary according to the variable volume of fluid within the fluid circuit.

In one example, the compensation device include a sleeve with an inner diameter approximately that of the outer diameter of a collapsed membrane of the fluid vessel 140 when fluid has been displaced from the portion of the fluid vessel 140 over which the sleeve is situated. Thus, when an actuator or a user slides the sleeve over the fluid vessel 140, fluid is displaced from the portion of the fluid vessel 140, over which the sleeve is situated. For example, the contraction device can function like a peristaltic mechanism using a sleeve of a small fixed inner diameter and moving the sleeve along the length of an elongated fluid vessel, the sleeve displaces fluid and resists the flow of fluid from the portion of the fluid vessel on one side of the sleeve to the portion of the fluid vessel on the opposite side of the sleeve, thereby reducing an effective volume of the fluid vessel. An actuator moves the sleeve from an end of the fluid vessel 140 opposite the end of the fluid vessel 140 coupled to the fluid channel of the dynamic tactile layer. By moving the sleeve from an end of the fluid vessel 140 toward the opposite end of the fluid vessel 140, the sleeve closes off a portion of the fluid vessel 140, and blocks fluid flow back into this portion of the fluid vessel 140. Thus, in this example, a fixed-size contraction device can couple to the fluid vessel to reduce the volume of the fluid vessel 140.

4.2 Modifying Range of Displacement Device

In another implementation, the compensation device compensates for fluid loss by modifying actuation of the displacement device 160. In this implementation, at an initial time, the fluid circuit is filled with a first volume of fluid and the displacement device 160 is calibrated to define initial and final actuator positions. In particular, the deformable region can be substantially flush with the first region of the tactile layer when the displacement device 160 is in the initial actuator position, and the deformable region can be consistently offset above the first region by a target distance when the displacement device 160 is in the final actuator position. The displacement device can thus displace a target volume of fluid as required to provide a predetermined amount of deformation (i.e., expansion) of the deformable region 118, such as to a desired height above the first region of the tactile layer. Over time, the volume of fluid within the fluid circuit decreases due to evaporation, absorption, leakage, or other fluid losses from the fluid circuit, and thus the initial calibrated displacement of the displacement device 160 from the first actuator position to the second actuator position no longer achieves the target offset height of the deformable region given such fluid loss. In order to again obtain the desired deformation of the deformable region 118 and displacement of the target volume of fluid, the compensation device can alter the initial position, the final position, and/or the calibrated distance between the initial and final positions of the displacement device. In particular, the compensation device can compensate for fluid loss by changing the initial and final position of the displacement device actuator.

Figure 3:
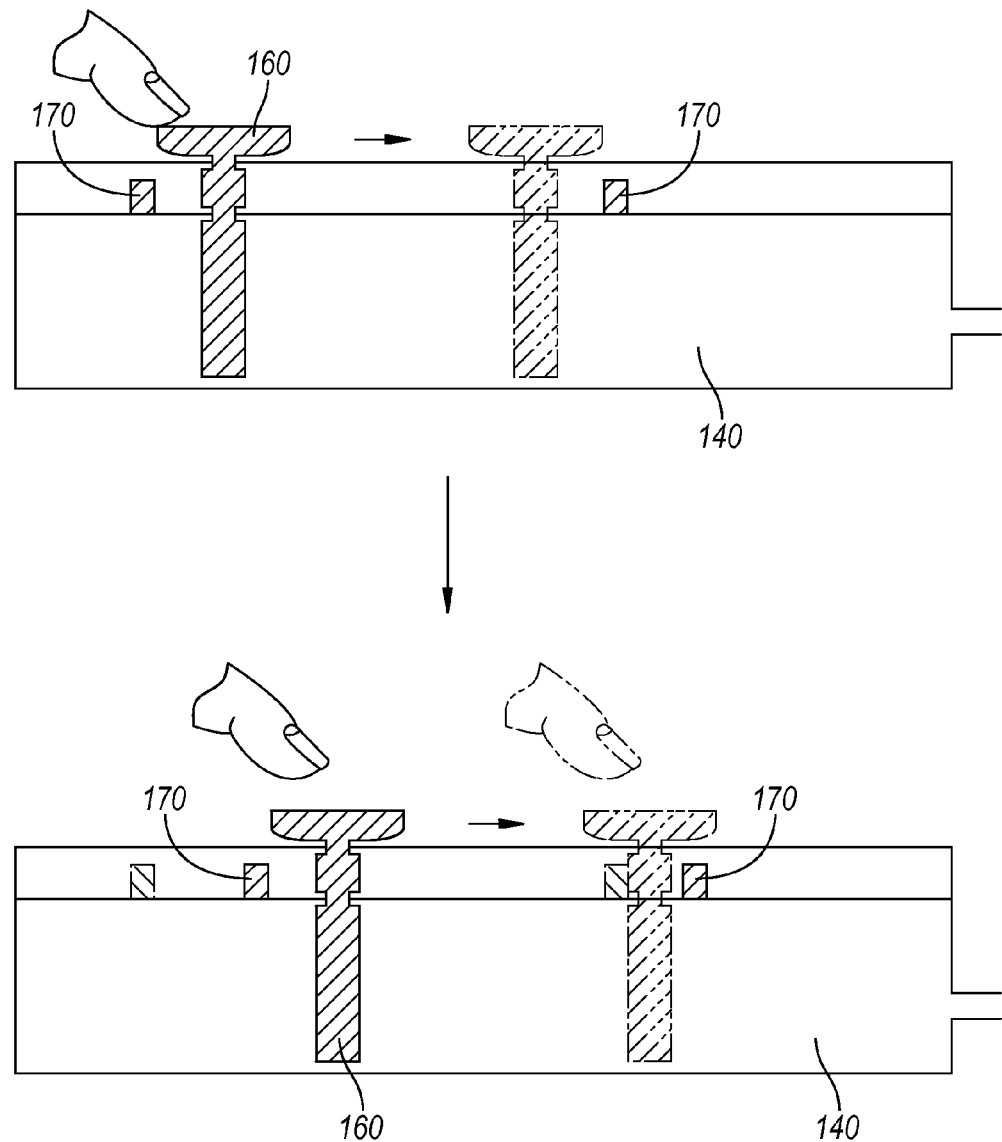
FIG. 3 is a flowchart representation of one variation of the dynamic tactile interface.

In one example, the displacement device can include a slide actuator that moves along a substantially linear path (as shown in FIG. 3), such as along a surface, a track, a ridge, a slot, etc. At an initial time, the slide actuator is calibrated to travel from an initial position to a final position (i.e., a "displacement distance"). The displacement distance can directly correlate to the displaced volume of fluid from the fluid vessel to transition the deformable region from the retracted setting into the expanded setting. At the initial time, the linear slide actuator is calibrated to displace the volume of fluid required to expand the deformable region 118. However, some time after the initial time, when the volume of fluid has decreased due to fluid losses, the distance the slide actuator travels may no longer correlate to the displacement of the volume required to expand the deformable region 118, and the compensation device can thus modify the slide actuator to accommodate the reduced volume of fluid in the fluid circuit by moving the initial position and the final position of the slide actuator. Thus, the compensation device moves the former initial position to a new initial position situated between the former initial position and the former final position. The compensation device also moves the former final position to a new final position offset from the new initial position by the displacement distance. Thus, the distance between the former initial position and the new initial position can correlate directly to the volume of fluid lost from the fluid circuit since the initial time. As the volume of fluid displaced by the displacement device 160 correlates to the displacement distance traversed by the slide actuator, by maintaining the displacement distance in the new shifted configuration of the slide actuation, the displacement device 160 displaces the same volume required to expand the deformable region 118 from flush with the first region of the tactile layer to the target height above the first region as at the initial time with the displacement device 160 in the former configuration, and the deformable region can be substantially flush with the first region when the displacement device 160 is in the first actuator position.

In the foregoing example, the compensation device 170 can include a device that dictates the initial position and final position of a linear slide actuator, such as stops or gates arranged along track that define a range for the slide actuator, such as shown in FIG. 3, FIG. 5, and FIGS. 6A, 6B, and 6D. The stops can include moveable shims that can be inserted into the track, set in a ridge, or placed on a surface, etc. along which the slide actuator travels to define travel limits (i.e., the first and second actuator positions) of the slide actuator. Alternatively the stops can include retractable gates established at intervals along the tracks, ridge, surface, etc. along which the slide actuator travels. The gates, when not in use, can be flush with the surface of the tracks, ridge, surface, etc. along which the slide actuator travels in order to avoid interference with movement of the slide actuator. When in use, the gates, extend substantially into the tracks, ridge, surface, etc. to restrict travel of the slide actuator beyond the gates. For example, a substantially planar gate can retract into the surface of a track in a direction that is substantially normal to the plane of the surface of the track. Likewise, when the gate is in use, the gate extends from the surface in a direction that is substantially perpendicular to the surface. Alternatively, the gates can pivot from a hinge located on or near the surface of the tracks, ridge, surface, etc. on which the slide actuator slides. Alternatively, the gates can include indentations or detents in the surface, which are covered and/or filled when not in use. As the slide actuator passes over the detents, a portion of the slide actuator sinks into the detent, substantially restricting further sliding beyond the detent. In this example, the displacement distance is maintained by defining new initial and final positions of the linear slide actuator, the initial and final positions separated by the displacement distance.

Figure 5:
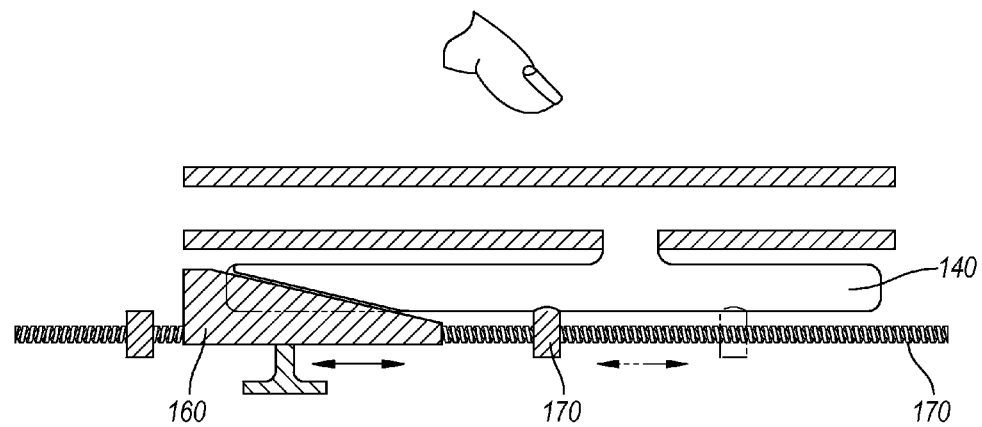
FIG. 5 is a schematic representation of one implementation of the dynamic tactile interface.

In the foregoing example, the compensation device can additionally or alternatively include a nut that defines the bounds of the displacement device movement by threading onto a lead screw, which runs through a hole in the displacement device 160. As shown in FIG. 5, the displacement device slides over the threaded rod in order to displacement fluid from the fluid vessel 140. The compensation device includes the threaded rod and two nuts, the nuts defining boundaries of the movement of the displacement device. The compensation device functions to substantially prevent the displacement device from moving outside the bounds defined by the nuts of the compensation device.

Figure 6A:
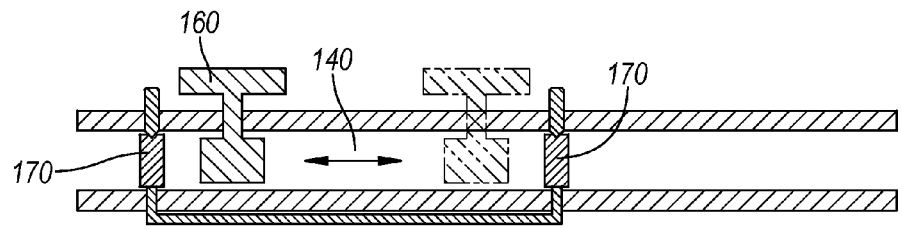
FIG. 6A is a schematic representation of one implementation of the dynamic tactile interface.
Figure 6B:
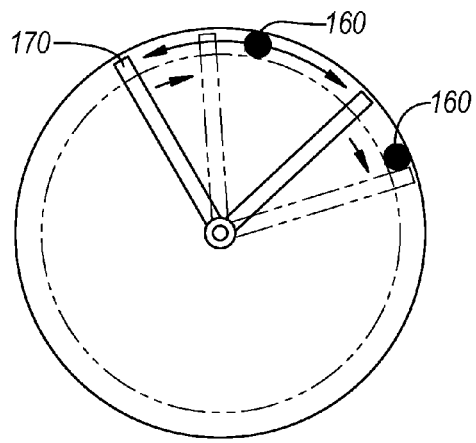
FIG. 6B is a schematic representation of one implementation of the dynamic tactile interface.
Figure 6C:
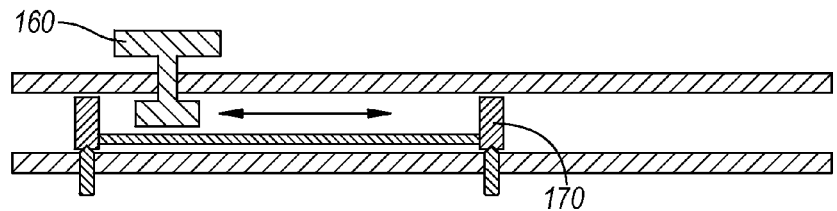
FIG. 6C is a schematic representation of one implementation of the dynamic tactile interface.
Figure 6D:
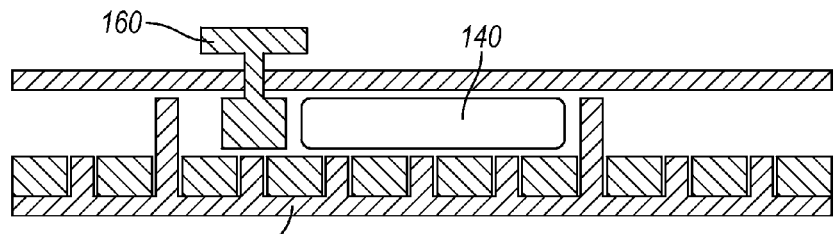
FIG. 6D is a schematic representation of one implementation of the dynamic tactile interface.

In another example similar to the foregoing, the compensation device includes a rotary displacement device slide actuator that rotates about a central axis. As shown in FIG. 6B, the rotary displacement device slide actuator, which is substantially cylindrical, includes a slot in the circumferential surface that spans a portion of the circumference of the cylinder. A compensation device including stops can be inserted in the slots. For example, the compensation device can include an angle device with two legs joined at a point, forming a "V" shape, wherein the ends of the legs define stops for the rotary displacement device slide actuator. The angle device can be set into the rotary displacement device slide actuator such that the legs extend from the center of the rotary displacement device slide actuator radially outward into the slots. The rotary displacement device slide actuator can be surrounded by a device, where the intersecting portion of the device with the rotary displacement device slide actuator has a contour that is inverse to the outer contour of the rotary displacement device slide actuator (e.g., concave). The device can include a protruding lever that fits within the rotary displacement device slide actuator slot. When the protruding lever intersects with the legs of the angle device during rotation of the rotary displacement device slide actuator, the legs of the angle device substantially restrict the rotation of the rotary displacement device slide actuator beyond the legs.

In a similar example, the compensation device 170 includes a clutch that functions to provide tactile indications notifying a user of the location of the boundaries of the displacement device movement rather than defined boundaries that substantially prevent the user from moving the displacement device beyond the boundaries defined by the compensation device. The clutch can provide feedback to a user operating the displacement device 160 in the form of a click, beep, etc. to indicate the boundaries of the displacement device 160. A user can move the displacement device beyond the boundaries defined by the clutch. However, tactile indicators can indicate to the user the location of the boundaries and may not substantially resist movement beyond the boundaries. The compensation device can alter the location of the boundaries indicated by the clutch such that the compensation device alters the initial and final positions of the displacement device.

In another example, the compensation device 170 can includes a device that changes the displacement distance of the slide actuator by altering the final position of the displacement device and maintaining the initial position. The slide actuator can travel a greater distance than the initial calibrated displacement distance in order to displace the required volume of fluid. In this implementation, the compensation device 170 can maintain the initial position of the displacement device 160 and vary the final position of the displacement device 160 as required to maintain the volume required to transition the deformable region 118. In this example, the displacement distance changes by defining a new final position of the displacement device and maintaining the initial position.

Figure 7:
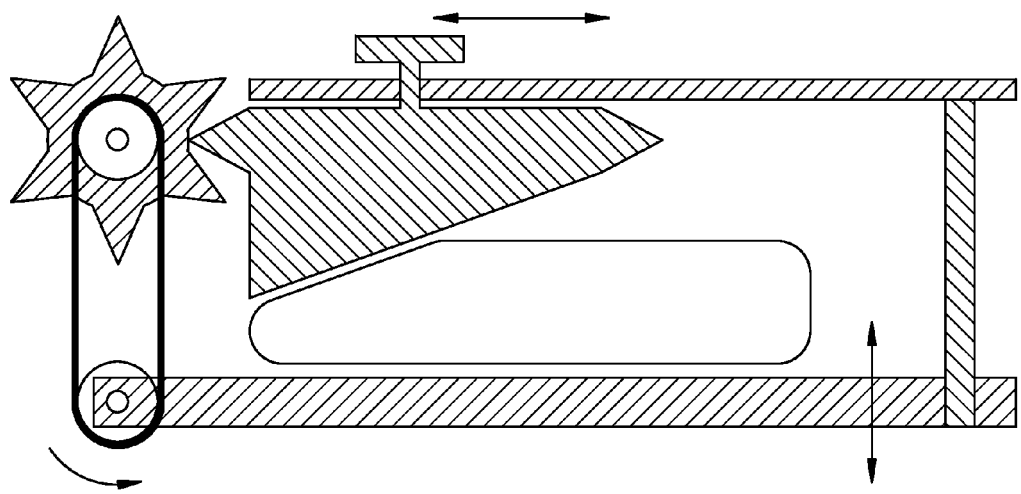
FIG. 7 is a schematic representation of one implementation of the dynamic tactile interface.

In another implementation, the compensation device 170 can include a ratcheting device that indexes a gear set in order to alter the effective volume of the fluid circuit or shift the range of the displacement device with each actuation of the displacement device. The ratcheting device can be coupled to the displacement device such that, over time, the ratcheting device restricts the movement of the displacement device. As shown in FIG. 7, one example of this implementation includes a compensation device including a pawl and gear set coupled to the dynamic tactile interface. The pawl can be configured to resist gear set rotation in a certain direction. A displacement device with a linear slide actuator slides interfacing with the spur gear and pawl at the final position of the displacement device. A ledge at the edge of the displacement device actuator engages the teeth of the gear, thereby causing the gear to spin in a direction opposite the direction that the pawl resists and that causes a pulley, another gear set, etc. to draw the fluid vessel closer to the interfacing surface of the displacement device (i.e., the surface of the displacement device that contacts the fluid vessel). By drawing the fluid vessel closer to the interfacing surface, the displacement device compresses the fluid vessel more than the compression of the fluid vessel at an initial time. With each actuation of the displacement device actuator, the engagement of the edge of the slide actuator with the gear of the compensation device causes incremental compression of the fluid vessel. Thus, in this example, the fluid compensation device can execute automatic incremental fluid compensation by compressing the fluid vessel incrementally for each actuation of the displacement device.

In another example, additionally or alternatively, the compensation device 170 can include a device coupled to the displacement device 160 that deposits material, such as graphite, oil, glass, etc., that, overtime, substantially restricts the movement of the displacement device 160. The compensation device 170 of this implementation can thus deposit material on the track on which the slide actuator slides, such that the deposits alter the initial and final position of the displacement device actuator, and a rate at which the compensation device thus deposits material can corresponds to a rate at which fluid is lost from the fluid circuit. The displacement device can deposit material automatically or following an event, wherein the user indicates the displacement device can deposit material in order to restrict the movement of the displacement device. For example, the displacement device can include a chamber that contains graphite. The chamber can include a port that remains closed until the user actuates the port open with a switch coupled to the displacement device and a cover arranged over the port. When the port is open, graphite within the chamber can exit the chamber, thereby depositing material on the track on which the slide actuator slides.

In another example, the fluid vessel 140 includes a tube with a first end coupled to a substrate, and the displacement device 160 includes a rotary actuator 170 coupled to the second end of the tube which is remote from the first end, the rotary actuator able to adjust the volume of the fluid vessel 140 by winding the tube to decrease the volume of the tube. The decreased volume resulting from rotating the rotary actuator 170 can directly correlate to the volume of fluid lost over a period of time in the fluid circuit.

For example, in this variation, the fluid vessel 140 of the dynamic tactile interface includes a tube including a first end and a second end opposite the first end, the first end constrained and defining an outlet, and a cap coupled to the second end of the tube. In this example, the volume of fluid 170 is arranged within the tube 341. Furthermore, the displacement device 140 includes: a rotary actuator 170 including an output shaft 146 coupled to the second end of the tube and configured to wind the tube to displace a portion of the volume of fluid from the tube. The actuator can be coupled to the tube and configured to change the volume of the tube in response to a loss of fluid by winding the tube to reduce the volume of fluid by an amount correlating to the loss of fluid.

The winding of the tube can be achieved by rotating a dial coupled to the remote end of the tube, the dial coupled to the tube through a circular jagged edge, the jagged edge of the dial conforming to and configured to engage a jagged edge of the remote end of the tube. When at rest, the dial and remote end of the tube are resting flush against each other. As the dial with the jagged edge is rotated, it will momentarily be forced away from the remote end of the tube as the jagged edges or teeth of the dial and tube end are not aligned. Once the dial and tube end are aligned, the dial will again rest flush with the remote end of the tube after causing a wind in the tube. The jagged edge keeps the dial in place, and the tube winding in place, counteracting any unwinding force applied to the dial by the tube. The displacement device 160 may also include a mechanism, such as a spring coupled to the dial actuator, configured to retract the actuator along a linear track and unwind the tube. In the example using a spring, the spring can be configured to balance a torque applied by the tube to an output shaft of the rotary actuator. The stored energy of the spring may slowly and automatically, and passively, compress the bladder. In an implementation, other mechanisms may be used, including a button. In an implementation using a button, the button may be physically depressed by a user to reset the winding/reservoir system, unwinding the tube, but would also reset the spring. By resetting the spring, the button would compress the spring to store energy that could be used to compress a bladder or otherwise reduce the volume of the fluid circuit. Thus, the mechanical action of a person depressing a button may be used to reset the spring as well as rest the winding in the tube. The mechanical action could be performed using other mechanisms as well, such as for example a slider that, when slid, would reset the spring as well as rest the winding in the tube. The dynamic tactile interface may incorporates a displacement device actuating a tube as described in U.S. patent application Ser. No. 14/081,519, which is incorporated in its entirety by this reference.

Figure 8:
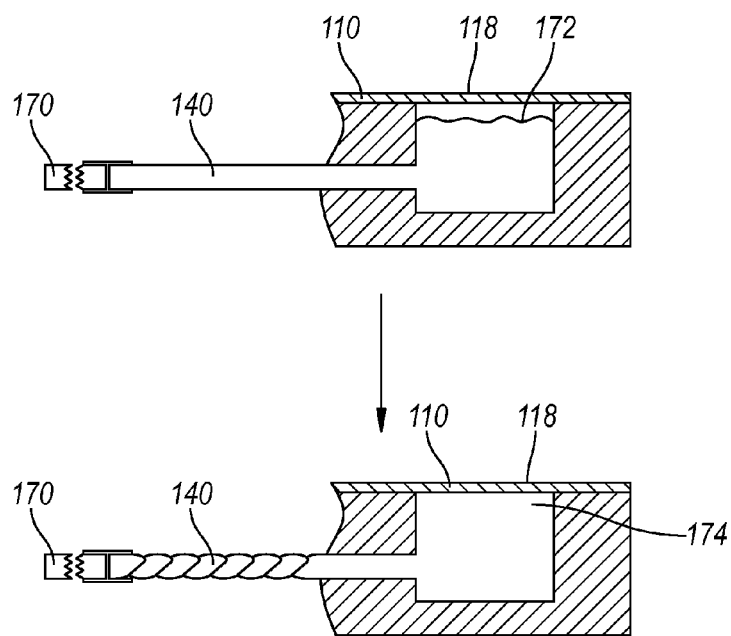
FIG. 8 is a schematic representation of one implementation of the dynamic tactile interface.

At an initial time, the rotary actuator 170 is calibrated to displace the volume of fluid required to expand the deformable region 118, for example, with minimal or no windings in a tube that implements fluid vessel 140. However, at a subsequent time after the initial time, if the volume of fluid has decreased due to fluid losses, the volume of fluid in the fluid vessel and throughout the dynamic tactile interface fluid circuit will decrease. As shown in FIG. 8, the volume of fluid in the fluid circuit has a level 172 that is less than the volume of the entire fluid circuit. As such, the fluid level may not be able to fully expand the deformable region 118. The rotary dial of the compensation device can thus modify the volume of the fluid vessel 140 in response to the reduced volume of fluid in the fluid circuit by experiencing a rotation and generating windings in the fluid vessel 140. As shown in FIG. 8, the dynamic tactile interface with windings in the fluid vessel provides a decreased volume for the fluid, recalibrating the fluid circuit to be able to fully expand the deformable region to an expanded setting and retract the deformable region to a retracted setting, modifying the fluid to have a level 174. Thus, the compensation device creates windings in the fluid vessel tube to adjust the volume of the fluid vessel to compensate for fluid loss that occurs over time in the dynamic tactile interface, allowing the actuator to continue to transition the deformable region between an expanded state and a retracted state as the fluid level in the interface system changes over time.

Figure 9:
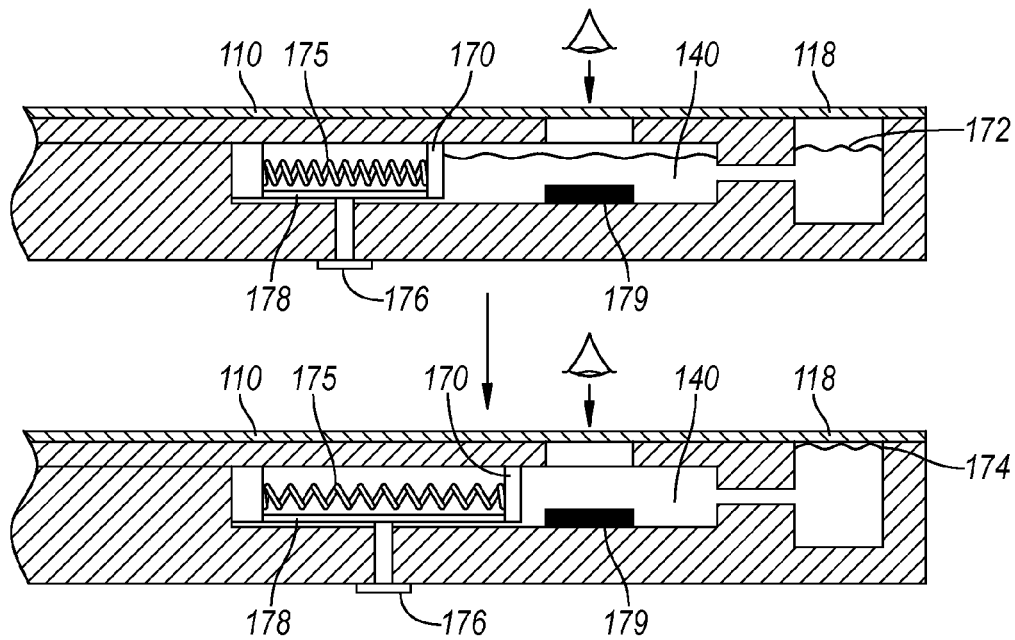
FIG. 9 is a schematic representation of one implementation of the dynamic tactile interface.

In an implementation, the dynamic tactile interface may include a visual indicator. The visual indicator may indicate when fluid has been lost within the fluid circuit of the dynamic tactile interface, signaling that a user should engage an actuator to adjust the volume of a fluid vessel to compensate for the fluid loss, thereby allowing the actuator to property displace fluid to expand the deformable region 118 to an expanded setting and retract the deformable region 118 to a retracted setting. As shown in FIG. 9, a visual indicator may be provided by a visual element 179 and a fluid vessel 140. A portion of fluid vessel 140 includes a visual element 179. The visual element may include a metallized coating, silver dye, or other material that may be visually detected by a user. The visual element may be placed within, on top of, or underneath the fluid vessel such that the visual element 179 aligns with an opening in a dynamic tactile interface housing to allow a user to see the visual element under certain conditions, the portion of the fluid vessel that includes the visual element being optically transparent. When a user looks at the visual element with no loss in fluid within the fluid circuit, the visual indicator may indicate a first state or "ok" state, which may be indicated by a line of a first color, a clear fluid vessel, or some other indication. When fluid loss occurs over a period of time, the loss of fluid can create air bubbles in the fluid vessel, thereby causing refraction when a user looks into the portion of the fluid vessel containing the visual element, and changing the appearance of the indicator from a line of a first color to a line of a second color, from a clear line to a dark line, or some other change indicator. In an implementation, if the tubing structure deflates slightly, it may also cause a change in the optical properties of the tubing, thereby providing a visual indication associated with the loss of fluid.

Figure 10A:
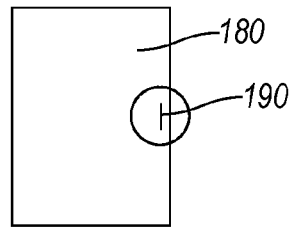
FIGS. 10A and 10B are representations of a dynamic tactile interface visual indicator.
Figure 10B:
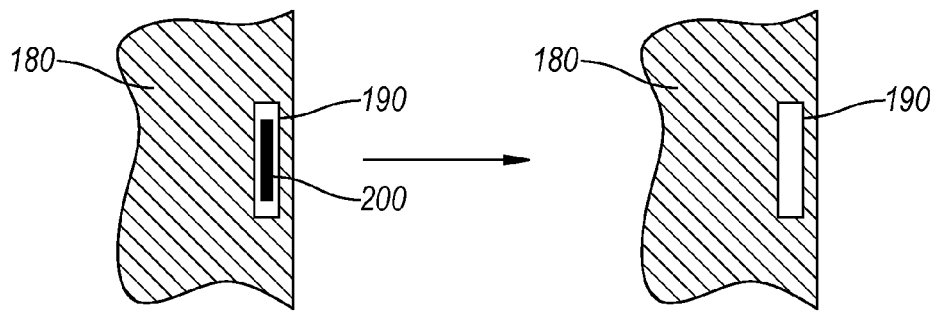

The visual indicator can be positioned within an optically transparent portion of the tube, wherein a user may see a first visual indication of the fluid volume within the tube when the tube is full of fluid and a second visual indication of the fluid volume within the tube when the tube is not full of fluid, such that, as shown in FIGS. 10A and 10B, the first visual indication and the second visual indication provide a different indication based on refraction caused when the tube is not full of fluid. When the visual indicator 190 indicates that the fluid level has decreased, such as for example by displaying the metallized portion 200 of the fluid vessel, a user may provide input to a displacement device to modify a volume of the fluid vessel in response to the loss of fluid. The input may be in the form of a fluid adjustment button, slide, or other mechanism. When implemented as a button, as shown in FIG. 9, the displacement device may include a spring 175, an actuator 170, a track bar 178, and a fluid adjustment button 176. The spring can apply a force to the actuator 170, which is coupled to track bar 178, which in turn is held in place by a notch on button 176. When depressed, the button 176 released track bar 178 to allow the spring to slowly expand and force the actuator to decrease the volume of the fluid vessel 140. As the volume decreases, the visual indicator may transition from indicating that the fluid vessel has experienced fluid loss through a first visual indication to indicating that the fluid vessel volume is properly calibrated with the volume of fluid—the smaller fluid vessel volume provides for proper transition between an expanded state and a retracted state of the deformable region—through a second indicator.

For example, while pressing the fluid adjustment button 176 and watching the visual indicator, a user may gradually see a visual indicator disappear or otherwise indicate that the dynamic tactile interface is property calibrated. Depression of the fluid adjustment button by a user allows for the fluid vessel volume to be adjusted, where the adjustment is caused by a spring that pushes a fluid vessel actuator or cap to decrease the volume of the fluid vessel while the volume adjustment button is depressed, the visual indicator transitioning from the second visual indicator to the first indicator when the volume adjustment button is depressed while the visual indicator provides a second visual indication.

As a person skilled in the art will recognize from the previous detailed description and from the figures and claims, modifications and changes can be made in the foregoing embodiments of the invention without departing from the scope of this invention as defined in the following claims.

We claim:

1. A dynamic tactile interface, comprising:
    a substrate defining a fluid channel and a fluid conduit fluidly coupled to the fluid channel;
    a tactile layer comprising a peripheral region and a deformable region, the peripheral region coupled to the substrate, and the deformable region arranged over the fluid conduit, disconnected from the substrate, and operable between a retracted setting and an expanded setting, the deformable region elevated above the peripheral region in the expanded setting;
    a tube comprising a first end fluidly coupled to the fluid channel and constrained relative to the substrate;
    a volume of fluid within the tube;
    a displacement device including a fluid vessel and an actuator, the actuator displacing fluid from the fluid vessel into the tactile layer to transition the tactile layer from the retracted setting to the expanded setting and from the tactile layer into the fluid vessel to transition the tactile layer from the expanded setting to the retracted setting; and a fluid compensation device coupled to the displacement device and adjusting the configuration of the displacement device in response to a change in volume of fluid contained within the fluid vessel,
    wherein the tube includes a visual indicator, and the visual indicator includes an optically transparent portion of the tube that indicates, to a user, changing the volume of fluid vessel based on the volume of fluid in the vessel.

2. The dynamic tactile interface of claim 1, wherein the fluid compensation device enables a user to compensate for fluid lost from the fluid circuit by manually modifying the volume of the fluid vessel.

3. The dynamic tactile interface of claim 2, wherein the fluid compensation device includes a flexible bladder filled with a second volume of fluid and a compensation device actuator, the compensation device actuator increasing the volume of the flexible bladder to reduce the volume of the fluid vessel and increasing the volume of the flexible bladder to decrease the volume of the fluid vessel.

4. The dynamic tactile interface of claim 3, wherein the compensation device actuator is manually used to increase the volume of the flexible bladder and decrease the volume of the flexible bladder.

5. The dynamic tactile interface of claim 2, wherein the fluid compensation device includes a stop gate within the fluid vessel, the stop gate substantially blocking fluid flow through the fluid vessel at the position of the stop gate within the fluid vessel.

6. The dynamic tactile interface of claim 5, further comprising a pump which can displace the fluid from one side of the stop gate to the other side of the stop gate, the stop gate positioned at an interval along the length of the fluid vessel so as to compensate for fluid loss from the fluid circuit.

7. The dynamic tactile interface of claim 5, the stop gate including a seal arranged about a perimeter of the stop gate, the seal sealing the stop gate against the interior surface of the fluid vessel.

8. The dynamic tactile interface of claim 2, wherein the fluid compensation device includes a contraction device to contract the fluid vessel to reduce the volume of the fluid vessel.

9. The dynamic tactile interface of claim 2, wherein the fluid compensation device includes a sleeve, the sleeve having an inner diameter approximately the same as an outer diameter of a collapsed membrane of the fluid vessel when the volume of fluid has been displaced from the portion of the fluid vessel over which the sleeve is situated.

10. The dynamic tactile interface of claim 1, wherein a user sees a first visual indication of the fluid volume within the tube when the tube is full of fluid and a second visual indication of the fluid volume within the tube when the tube is not full of fluid, the first visual indication and the second visual indication providing a different indication based on refraction caused when the tube is not full of fluid.

11. The dynamic tactile interface of claim 10, further including a volume adjustment button, wherein depression of the fluid adjustment button by a user allows for the fluid vessel volume to be adjusted, the adjustment caused by a mechanism that cause a fluid vessel cap to decrease the volume of the fluid vessel while the volume adjustment button is depressed, the visual indicator transitioning from the second visual indicator to the first indicator when the volume adjustment button is depressed while the visual indicator provides a second visual indication.

12. The dynamic tactile interface of claim 1, wherein the fluid compensation device modifies an initial position and a final position of the actuator based on the change in volume of fluid contained within the fluid vessel and a desired height of a deformable region.

13. The dynamic tactile interface of claim 12, wherein the displacement device includes a slide actuator, the slide actuator traveling a first displacement distance at an initial time along a linear path to displace a first volume of fluid from the fluid vessel, the displacement distance modified by an amount that correlates to the volume of fluid lost since the initial time.

14. The dynamic tactile interface of claim 12, wherein the displacement device includes a spring, the spring passively traveling a first displacement distance at an initial time along a linear path at a fixed rate to displace a first volume of fluid from the fluid vessel, the displacement distance modified by an amount that correlates to the volume of fluid lost since the initial time.

15. The dynamic tactile interface of claim 12, wherein the compensation device includes a stop arranged along the path of the slide actuator, the stop established at intervals in the linear path along which the slide actuator travels, the stop setting a limit to the movement of the actuator.

16. The dynamic tactile interface of claim 12, wherein the compensation device includes a nut arranged along the path of the slide actuator, the nut threaded onto a screw positioned along the linear path along which the slide actuator travels.

17. The dynamic tactile interface of claim 12, wherein the compensation device includes a rotary displacement device that is cylindrical and rotates along a central axis, the rotary displacement device including a slot in a circumferential surface and stops inserted into the slots.

18. The dynamic tactile interface of claim 12, wherein the fluid vessel includes the tube, the actuator coupled to the tube and configured to change the volume of the tube in response to a loss of fluid by winding the tube to reduce the volume of fluid by an amount correlating to the loss of fluid.

19. The dynamic tactile interface of claim 18, comprising a spring coupled to the actuator configured to retract the actuator along a linear track and unwind the tube.

20. The dynamic tactile interface of claim 18, wherein the winding of the tube is achieved by rotating a dial coupled to the tube, the dial coupled to the tube through a circular jagged edge, the jagged edge of the dial conforming and configured to engage a jagged edge of the tube.

21. The dynamic tactile interface of claim 19, wherein a user sees a first visual indication of the fluid volume within the tube when the tube is full of fluid and a second visual indication of the fluid volume within the tube when the tube is not full of fluid, the first visual indication and the second visual indication providing a different indication based on refraction caused when the tube is not full of fluid.

22. The dynamic tactile interface of claim 19, further including a volume adjustment button, wherein depression of the fluid adjustment button by a user allows for the fluid vessel volume to be adjusted, the adjustment caused by a spring that pushes a fluid vessel cap to decrease the volume of the fluid vessel while the volume adjustment button is depressed, the visual indicator transitioning from the second visual indicator to the first indicator when the volume adjustment button is depressed while the visual indicator provides a second visual indication.

* * * * *